United States Patent [19]

Yamada et al.

[11] Patent Number: 5,088,082
[45] Date of Patent: Feb. 11, 1992

[54] DUST REMOVING SYSTEM FOR OPTICAL DISK DEVICE

[75] Inventors: Yuichi Yamada, Yokohama; Kazuo Ikeda, Toyokawa; Kouichi Ihara, Yokohama, all of Japan

[73] Assignees: Hitachi Video Engineering, Inc., Yokohama; Hitachi, Ltd., Tokyo, both of Japan

[21] Appl. No.: 563,701

[22] Filed: Aug. 7, 1990

[30] Foreign Application Priority Data

Aug. 9, 1989 [JP] Japan ................. 1-204678
Oct. 25, 1989 [JP] Japan ................. 1-275850

[51] Int. Cl.$^5$ ................ G11B 3/58; G11B 15/18
[52] U.S. Cl. ................ 369/71; 369/72; 360/69
[58] Field of Search ........ 369/71, 72, 73, 74, 369/292; 360/97.02, 69, 128; 15/DIG. 12, DIG. 13, DIG. 14

[56] References Cited

U.S. PATENT DOCUMENTS

| 4,685,303 | 8/1987 | Branc et al. | 369/19 |
|---|---|---|---|
| 4,870,636 | 9/1989 | Yamamoto | 369/71 |
| 4,931,338 | 6/1990 | Toffle | 360/135 |

FOREIGN PATENT DOCUMENTS

| 0110640 | 5/1987 | Japan | 369/72 |
|---|---|---|---|
| 0020786 | 1/1988 | Japan | 369/71 |
| 0127467 | 5/1988 | Japan | 369/72 |
| 0153782 | 6/1988 | Japan | 364/72 |
| 0244477 | 10/1988 | Japan | 369/72 |
| 0293781 | 10/1988 | Japan | 369/72 |
| 0146177 | 6/1989 | Japan | 369/72 |
| 0185840 | 6/1989 | Japan | 369/71 |
| 0029938 | 1/1990 | Japan | 369/72 |

*Primary Examiner*—Stuart S. Levy
*Assistant Examiner*—Tan Nguyen
*Attorney, Agent, or Firm*—Antonelli, Terry, Stout & Kraus

[57] ABSTRACT

In a dust removing system, the level of influence of dust sticking to an objective lens of an optical head is detected from either an amount of light emitted from the optical head and reflected from an optical head or from an access time. Three stages of levels with regard to the degree of influence of the dust are set in accordance with such detection value, and a different message for the removal of dust is indicated on a display unit in response to the level of the influence. When the influence is low, a dust removing mechanism is automatically rendered operative to remove the dust. At the first level at which the influence of dust is low, the optical disk in the optical disk device is discharged and cleaning of the objective lens is performed, and an indication is provided on the display unit representing that cleaning is proceeding. When the second stage is detected, the optical disk in the optical disk device is discharged, and a message is indicated on the display unit representing that cleaning of the objective lens should be performed using a cleaning disk. When the third stage is detected, a message is indicated on the display unit representing that cleaning of the objective lens should be performed by manual operation.

18 Claims, 15 Drawing Sheets

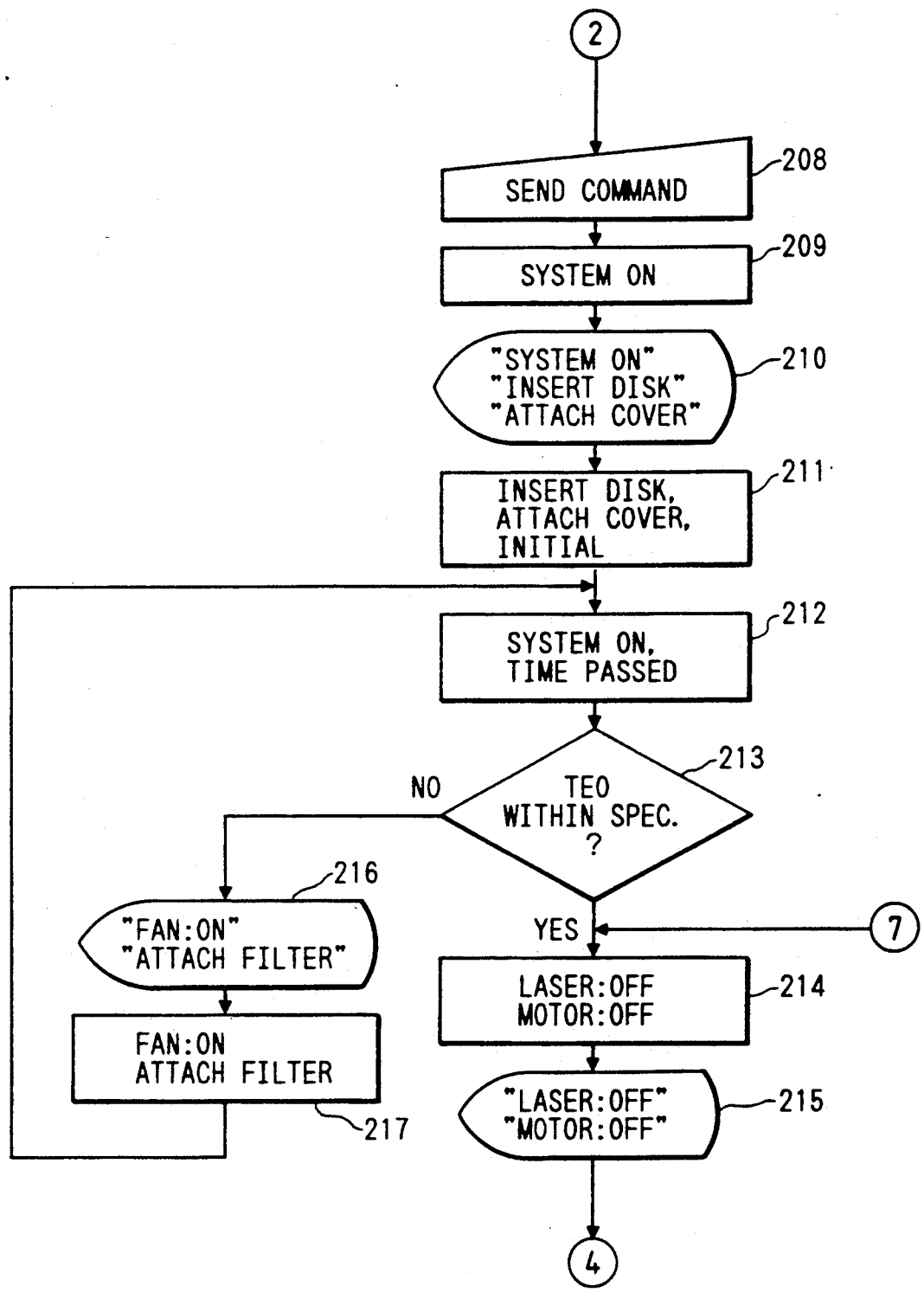

DUST REMOVING SYSTEM FOR OPTICAL DISK DEVICE

BACKGROUND OF THE INVENTION

This invention relates to a dust removing system for an optical disk device, and more particularly to a system for cleaning an objective lens of an optical head in an apparatus in which an optical disk device is employed.

As types of optical disk devices, there are optical disk recording and/or reproducing devices, magnetic optical disk recording and/or reproducing devices and so forth. Those optical disk devices perform high density recording and/or reproduction of information on and- /or from an optical disk and have a feature that a record medium can be exchanged readily. On the other hand, since those optical disk devices deal with light, a laser beam projected from an objective lens or a laser beam reflected from a disk and focused by an objective lens may possibly be obstructed by dust accumulated from the ambient air during use for a long period of time, which will cause deterioration in performance of the optical disk device such as irregular access.

Meanwhile, frictional resistance at a sliding portion of a bearing for a linear motor for driving an optical head may be increased by use for a long period of time or sliding resistance may be increased by dust, which increases a seek time of the optical head.

Conventionally, such apparatus are known wherein a dust protective wall or a filter is provided for the dustproof object, and an upper face of a lens is cleaned in response to an inserting operation of a disk by means of a brush serving as a manual or automatic dust removing mechanism for the removal of dust while movable parts are lubricated. An exemplary one of apparatus wherein a filter is used for the removal of dust is disclosed in U.S. Pat. No. 4,777,549.

Such conventional apparatus do not take such measures as positive detection against a delay in access time or the like which may arise from dust accumulated on an objective lens. No measures for the protection against dust by positive maintenance are taken either. Further, a method for coping with a case wherein dust cannot be removed even if an upper face of an objective lens is cleaned by a brush is not provided clearly. Further, since a method of lubricating a sliding portion or a method of removing dust is not clearly indicated in detail, much time may be required for a user or a service man to disassemble the device and clean an upper face of an objective lens, or dust cannot be removed. Accordingly, there is a problem that the MTBF (Mean Time Between Failures) is decreased while the MTTR (Mean Time To Repair) is increased, and the availability of the system is deteriorated. Further, there is a problem that the reliability of the system is deteriorated. Also there is a problem that the maintenance property of the system is low.

SUMMARY OF THE INVENTION

It is an object of the present invention to provide a dust removing system for an optical disk device which is high in availability.

In order to attain the object, according to the present invention, a degree of accumulation of dust is detected and the dust is removed automatically in response to a level of such accumulation. In addition removal of dust is performed also by a manual operation when it is detected that this is necessary.

Further, the system of the present invention has functions of providing maintenance information of a method of removing dust on an optical head, or of lubrication of a sliding portion or the like to a user or a service man, and of performing self maintenance operations, when appropriate.

More particularly, an access time, a level in intensity of a laser beam emitted from an optical head or reflected from a disk, state information and so forth are transmitted to a host computer or a control section of the system. Further, amounts of a seek time, a latency time and a data transfer time are detected, and a cause of them is judged in accordance with a programmed algorithm. Then, if the cause is dust, an automatic or manual dust removing method and a procedure of such method are indicated in an interactive language on a display unit to remove dust. On the other hand, in case the cause is a delay in seek time of an optical head driving device, a method of lubricating a driving portion and a procedure of the method are indicated on the display unit to remove dust. Further, in case dust cannot be removed, a method of raising the level of the output power of a laser and a procedure of the method are indicated on the display unit while a method of adjusting the instruction waiting time for switching a motor for the rotation of a disk and the laser on and off in order to prevent dust from being sucked into the system from external air is also indicated on the display unit. Or, when the value of a detection amount comes to a level which may lead to a system down, information of replacement of the device is indicated in an interactive language on the display unit within a performance recovery time, and in a system wherein the device is connected to a central computer by way of a communication line, such information of replacement of the device is transmitted to a storage device or a display device of the central computer. It is to be noted here that the seek time is a time required for an optical head to move from a current position to another predetermined position on an optical disk. The latency time is a time required until a disk is rotated, at a predetermined position of an optical head to which the optical head has been moved, to a position at which a desired read address or write address of the disk reaches the position of the optical head. In other words, the latency time is a mean value between 0 second and a time required for the disk to make one complete rotation. The instruction waiting time is defined as an interval of time until rotation of the motor for the rotation of a disk and emission of light from a laser diode are stopped and a standby condition is entered after the last instruction has been executed.

Since automatic cleaning of the objective lens or a cleaning method by manual operation and such procedure are indicated on the display unit, an operator can recognize it readily and accordingly can perform a maintenance readily in a good order, and accordingly, the MTTR (Mean Time To Repair) is decreased. Further, since a dust removing timing can be performed in stages and periodically, the MTBF (Mean Time Between Failures) can be increased suitably to improve the availability and the maintenance property.

BRIEF DESCRIPTION OF THE DRAWING

FIGS. 8A to 8I are detailed flow charts of the program of the embodiment of the present invention.

DETAILED DESCRIPTION OF THE PREFERRED EMBODIMENT

Figure 1:
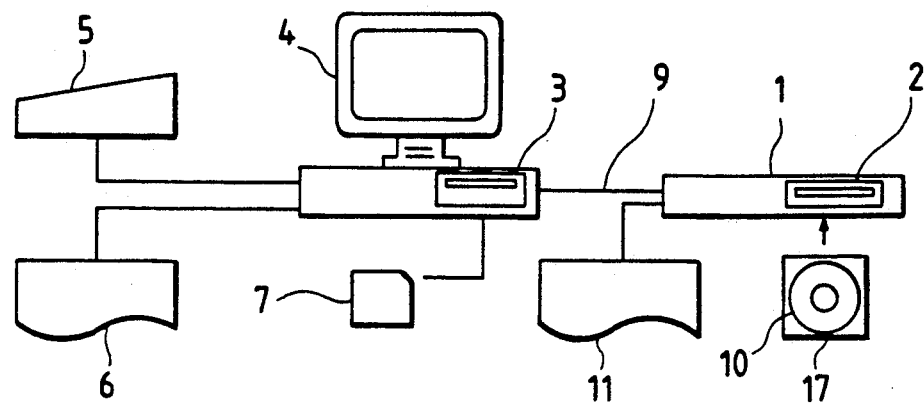
FIG. 1 is a block diagram showing a system construction of an embodiment of the present invention.
Figure 2:
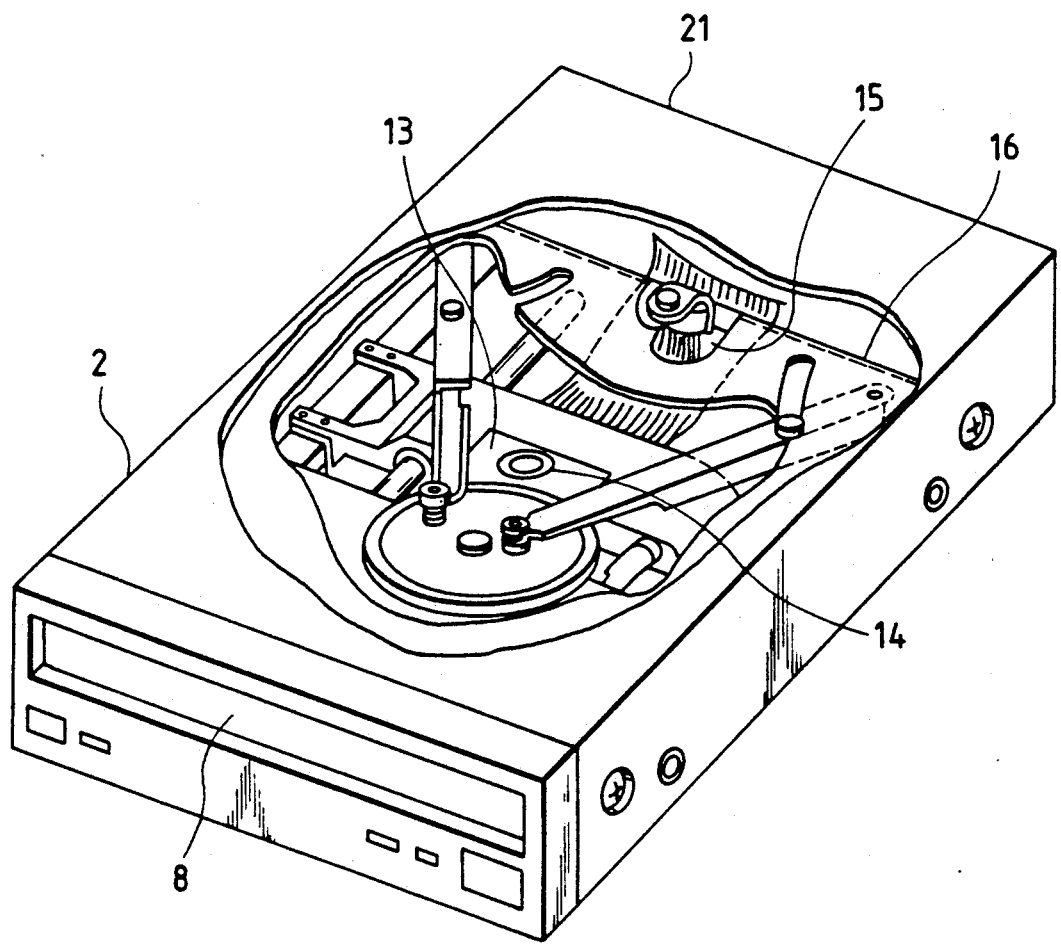
FIG. 2 is a perspective view showing a profile of an optical disk drive device of the built-in type of the embodiment of the present invention.

In the following, an embodiment of the present invention will be described with reference to FIGS. 1 to 8I. Referring first to FIG. 1, reference numeral 1 denotes an optical disk device of the stand alone type, wherein an optical disk driving device 2 of the built-in type is carried in the inside of the optical disk device 1. The optical disk driving device 2 is shown in FIG. 2, and details thereof will be hereinafter described. The optical disk device 1 has a signal processing section which demodulates a signal detected by an optical head in the inside of the optical disk driving device 2. The optical disk device 1 is connected to a host computer 3. A display unit 4, a keyboard 5 and a printer 6 are connected to the host computer 3. The host computer 3 is controlled in accordance with a program stored in a floppy disk inserted therein. Meanwhile, the optical disk device 1 has a function of reading and restoring compressed image data and so forth from the host computer 3 in the form of a personal computer or the like by way of a bus 9, and transferring data thus obtained to the host computer 3. Further, the optical disk device 1 has a built-in function of an interface to a laser beam printer 11 connected thereto and having a function of producing a hard copy of restored image data.

Details of the optical disk driving device 2 of the built-in type are shown in FIG. 2. A brush 15 for automatically cleaning an objective lens 14 provided on an optical head 13 is provided in a cassette accommodating case 16. An optical disk 10 is accommodated in a cassette 17 which is accommodated in the cassette accommodating case 16. The cassette 17 is inserted into the optical disk driving device 2 through an insertion hole 8 of the drive device 2, and a movable lid is provided for the insertion hole 8. A knob (not shown) is provided for adjusting the output power of a laser beam. The knob can be turned after a lid (not shown) secured to a lower face of the driving device 2 by means of a screw or the like is removed. Meanwhile, reference numeral 21 denotes a cover for a body of the disk device 2.

The host computer 3 has a function of stopping the laser power and a turntable in accordance with an access time, a seek time, a latency time, a data transfer time, a reflection level of the laser power, a speed of rotation of the turntable or a length of an instruction waiting time, as well as a function of detecting and storing a stopping interval of time and discriminating a magnitude. The host computer 3 has the further function of indicating such information in an interactive language on a display unit and a function of executing a series of programs described below. It is to be noted that an access time is a sum of a seek time, a latency time and a data transfer time.

Figure 3:
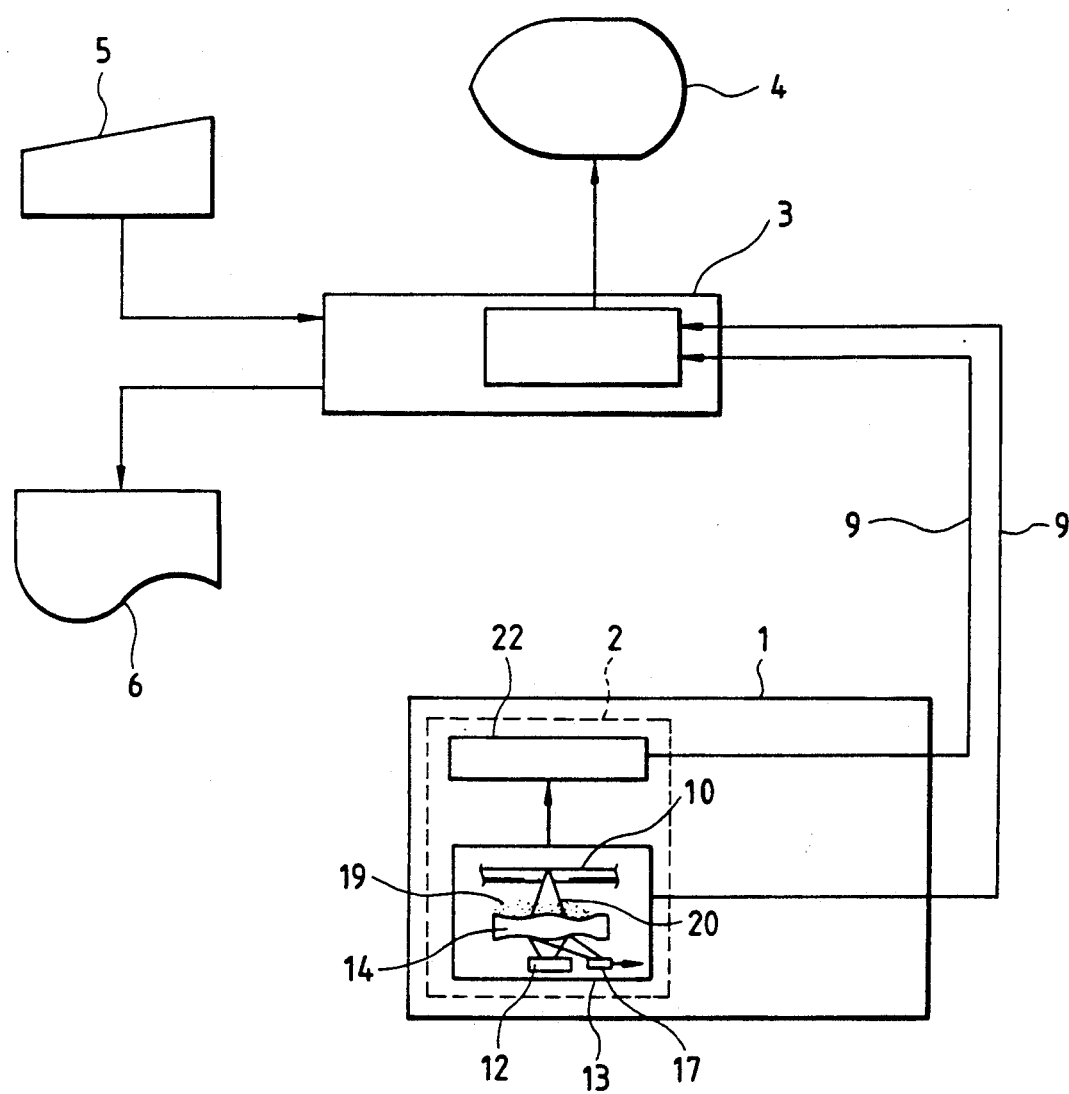
FIG. 3 is a block diagram showing a connecting construction between an optical pickup of an optical disk recording and reproducing device of the embodiment of the present invention and a host computer.
Figure 4:
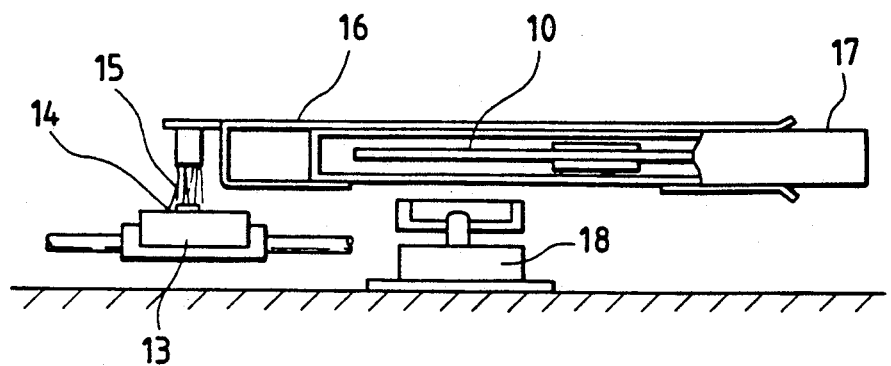
FIG. 4 is a partial sectional view as viewed from a side of the disk drive device of the embodiment of the present invention.

The optical disk driving device 2 includes an inserting and discharging section having a function of rotating a motor (not shown) in response to an external operation such as insertion of the cassette 17 and another function of positioning or discharging a disk 10 onto or from reproducing means or recording means, the optical head 13 for reading or writing information from or onto the disk 10, and a controlling section 22 (FIG. 3). The cassette 17 is inserted in position by way of the location of the door 8.

The accommodating case 16 for a cassette 17 of the disk driving device 2 shown in FIG. 2 in which the disk 10 is built includes the brush 15 for the cleaning. As shown in FIG. 3, light emitted from the laser diode 12 is condensed by the objective lens 14 and irradiated upon the optical disk 10. Then, light 20 reflected from the optical disk 10 passes through the objective lens 14 again and is converted into an electric signal by an optical detector 17. The intensity of a beam of the reflected light 20 from the disk 10 is reduced by dust 19 on the objective lens 14, and if it is reduced to a certain fixed level, a signal is developed from the controlling section 22 to move the optical head 13 until the objective lens 14 is abutted with an end of the brush 15, and the brush 15 or objective lens 14 is moved finely relative to the other to clean the objective lens 14. As a method of detecting an amount of dust on the objective lens 14, a photodetector may be disposed between the objective lens 14 and the optical disk 10 to detect emergent light from the objective lens 14.

Meanwhile, if the upper cover 21 is removed, then the objective lens 14 is exposed as shown in FIG. 2 so that the objective lens 14 can be cleaned using an applicator. Further, though not shown, in order to prevent direct projection of a laser beam, a wall is provided at a location at which a laser beam is to be irradiated, and a change-over switch is provided for lowering the level of a laser beam in response to movement of the cover 21.

Subsequently, various reference characters to be used in the present embodiment will be described. TA (Time of Access) is an amount to be detected and represents an access time while TA0 (Time of Access (0)) represents an initial access time. TS (Time of Seek) is an amount to be detected and represents a seek time while TS0 (Time of Seek (0)) represents an initial seek time. NR (Number of Rotation) is an amount to be detected and represents a number of rotations of the disk motor while NR0 (Number of Rotation (0)) represents an initial number of rotations. LP (Laser Power) is an amount to be detected and represents an output level of the laser power while LP0 (Laser Power (0)) represents an initial output level of the laser power. LR (Laser Reflection) is an amount to be detected and represents a reflection level of the laser power while LR0 (Laser Reflection (0)) represents an initial reflection level of the laser power. Further, ITA (Interval of Time of Access) represents an access time detection interval while LP/off (Laser Power off) represents an instruction waiting time until the laser power is stopped after transmission of an instruction from the personal computer has lost, and M/off (Motor off) represents an instruction waiting time until rotation of the disk motor is stopped after transmission of an instruction from the personal computer has lost.

Figure 5:
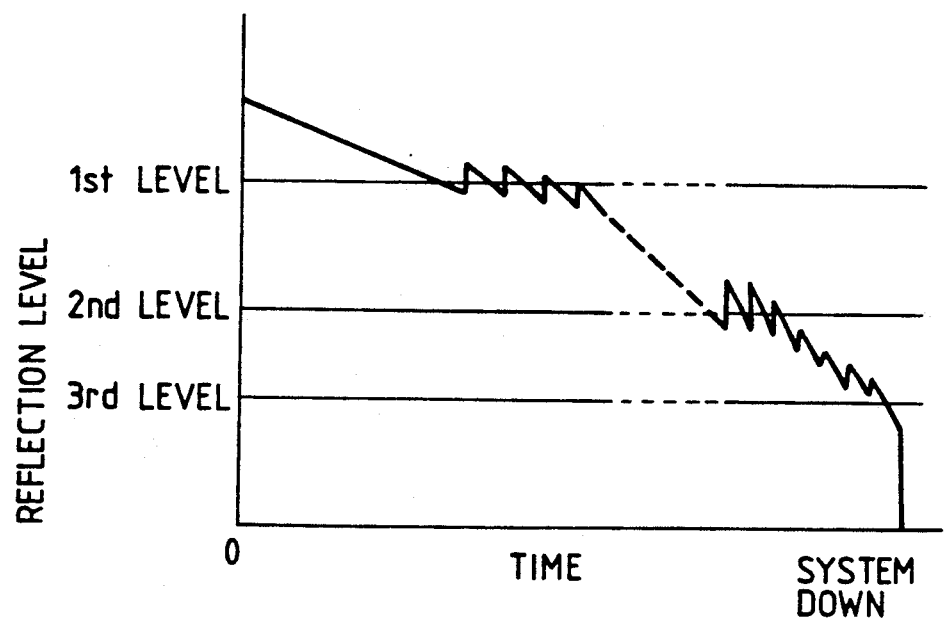
FIG. 5 is a graph showing a drop of reflected light of an optical head section with respect to an elapsed time in a condition during use of the optical disk recording and reproducing device according to the embodiment of the present invention.

Meanwhile, K1, K2 and K10 represent constants from which, if K1 is multiplied by a detection amount TA0 of an initial access time and K2 is multiplied by a detection amount LR0 of an initial laser beam reflection level and then K10 is multiplied by an initial seek time TS0, such values are obtained as represent, if they are indicated in laser light reflection level, levels at the first stage shown in FIG. 5 and and levels at a stage at which they do not reach a performance limit value but an automatic maintenance function of the device such as, for example, automatic removal of dust by the dust removing brush may be obtained, and the constants are determined from experience values, experiment values or calculation values.

Meanwhile, K3, K4, K6 and K9 represent constants from which, if K3 is multiplied by a detection amount LR0 of an initial laser light reflection level and K4 is multiplied by a detection amount LP0 of an initial laser power level and then K6 is multiplied by a detection amount TA0 of an initial access time and further K9 is multiplied by a detection amount TS0 of an initial seek time, such values are obtained as represent, if they are indicated in laser light reflection level, levels at the second stage shown in FIG. 5 and levels at which a maintenance is to be performed by a service man, and the constants are determined from experience values, experiment values or calculation values.

Meanwhile, K5, K7 and K8 represent constants from which, if K5 is multiplied by a detection amount TE0 of an initial ambient temperature and K7 is multiplied by a detection amount TA0 of an initial access time and then K8 is multiplied by a detection amount of an initial laser light reflection level, such values are obtained as represent, if they are indicated in laser light reflection level, levels at the third stage shown in FIG. 5 and levels which exceed the performance recovery limit value for a fixed interval of time, and those constants are determined from experience values, experiment values or calculation values.

Further, N(1), N(2) and N1 to N7 represent counters for storing a number of maintenances.

Figure 6:
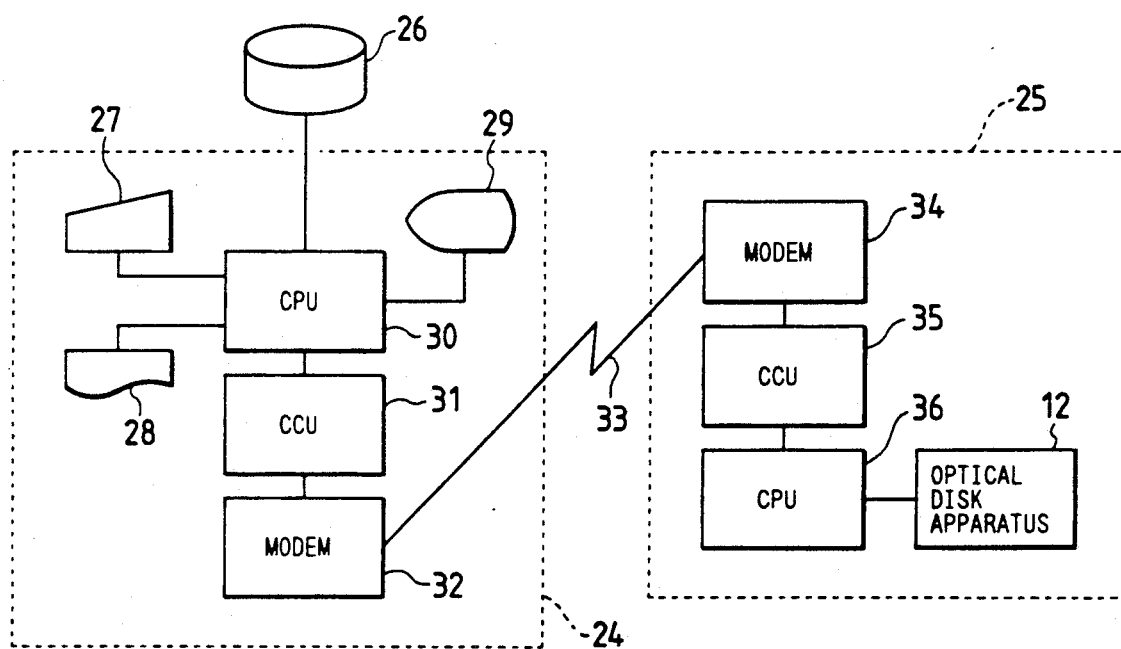
FIG. 6 is a block diagram showing a system construction of the embodiment of the present invention.

Meanwhile, a construction of a system to which the present invention is applied includes not only the system of FIG. 1 but also such a system as shown in FIG. 6 wherein a central computer 24 is connected to a terminal 25 by way of a communication line 33 and the terminal 25 is connected to the devices 1 and 2 by way of a MODEM (Modulator Demodulator) 34, a CCU (Communication Control Unit) 35 and a CPU (Central Processing Unit) 36 such that individual detection amounts are stored into an external storage device 26 of a central computer 24 by way of the terminal 25 so that they are monitored at any time.

Figure 7A:
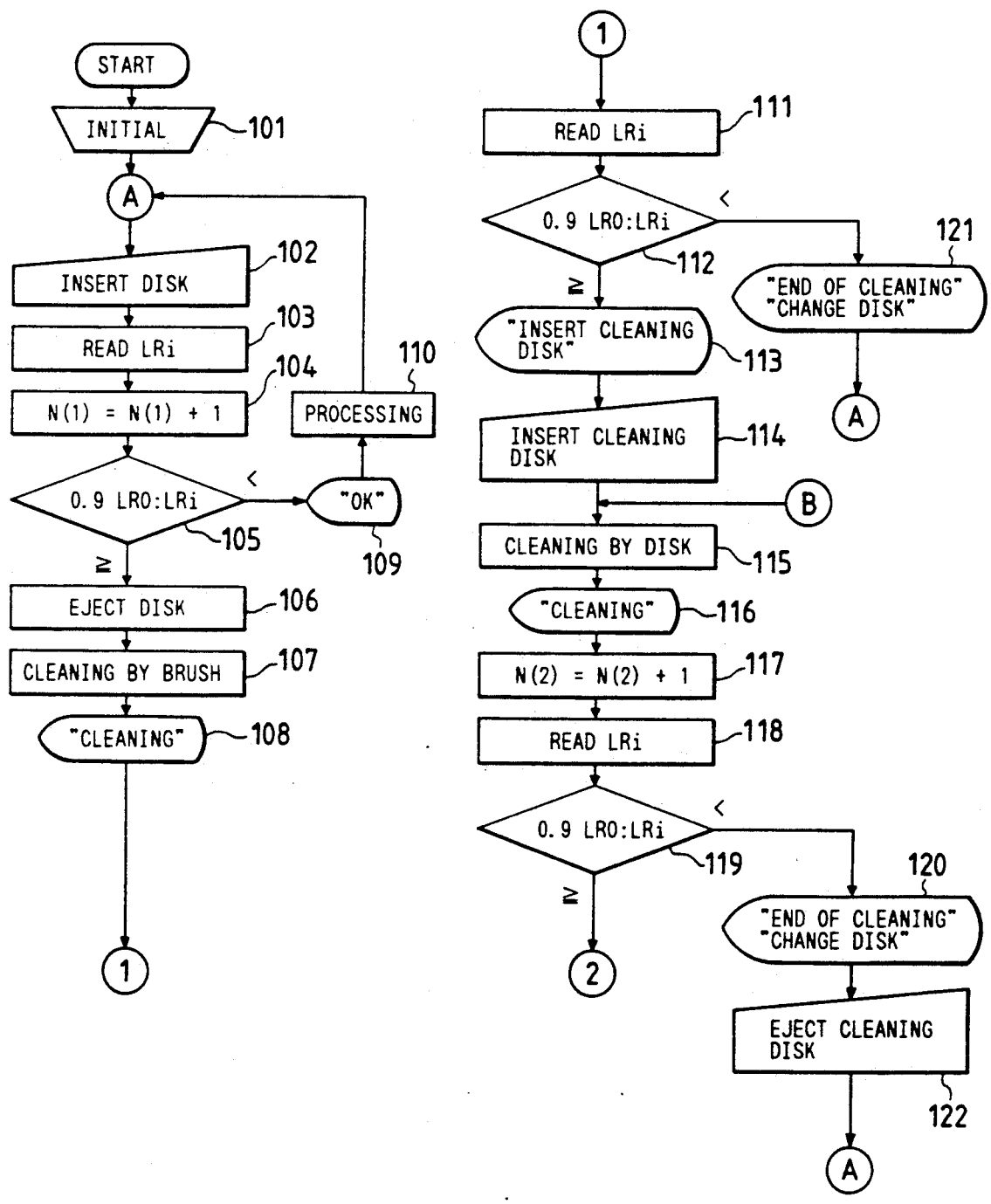
FIGS. 7A and 7B are flow charts of a program of the embodiment of the present invention.

In the apparatus having such construction as described above, a procedure for performing only removal of dust will be described in accordance with the block diagram of FIG. 3 and the flow charts of FIGS. 7A and 7B.

The devices 1 and 2 will be connected to the personal computer system shown in FIG. 6, and then setting of initial values of the devices 1 and 2 is executed (step 101). This is executed automatically by operation of a keyboard after the devices 1 and 2 are connected to the system and the power is turned on. Such setting of initial values proceeds such that LR0 (an initial reflection level) is stored, and then a detection interval T0 of LR0 is set, and the counters N(1) and N(2) are set to 0 (zero). Subsequently, an indication is provided on the display unit 4 or 29 representing that a cassette 17 should be inserted into the driving device 2, and an operator will insert a cassette 17 (step 102). Then, the devices 1 and 2 read a level LRi of reflected laser light of the optical pickup (step 103), and the counter N(1) is incremented by one (step 104). If it is judged at step 105 that the value LRi is at the first stage at which it is lower by about more than 10% than the initial value LR0, the cassette 17 is discharged (step 106), and automatic dust removal by the brush 15 is executed (step 107).

In this instance, the controlling section 22 of the disk driving device 2 may judge the first stage and execute automatic removal of dust, or else a level of the reflected light 20 may be transmitted directly to the host computer 3 or 30 by way of the bus line 9 so that control section of the host computer 3 or 30 may judge the first stage and execute automatic removal of dust. During removal of dust at step 107, an indication of "cleaning" representing that cleaning of the objective lens should be performed is provided on the display unit 4 or 29 by way of the host computer 3 or 30 (step 108).

Then, the devices 1 and 2 read a level LRi of reflected laser light of the optical pickup (step 111), and if the controlling section of the host computer 3 or 30 or the controlling section 22 of the devices 1 and 2 judges that the level LRi of the reflected light 20 has returned to a certain fixed level (step 112), then the dust removing operation is stopped, and an indication of "CHANGE DISK" representing that the disk should be exchanged is provided on the display unit so as to continue processing (step 121). After that, the sequence returns to a branch A, and in accordance with step 102, a disk will be inserted and then processing is continued.

Meanwhile, if the decrease of the reflection level at step 105 remains within 10% of the initial value LR0, an indication of "OK", representing that the dust level has remained within an ordinary range, is provided (step 109), and processing is continued (step 110).

Even if such operations are repeated, a point is eventually reached after a long period of use when the dust 19 on the objective lens 14 shown in FIGS. 2 and 3 will not be removed, and finally if it is judged that the level of the reflected light 20 has decreased to the second stage (step 112). At that time the controlling section of the host computer 3 or 30 or the controlling section 22 of the devices 1 and 2 which continuously receive reflected light from the devices 1 and 2 by way of the bus 9 develops a signal to cause the display unit to provide thereon an indication representing that the disk should be discharged and a cleaning disk should be inserted instead (step 113). Then, if a cleaning disk is inserted (step 114), cleaning of the objective lens by the cleaning disk is performed (step 115). An indication of "CLEANING" representing that cleaning by the cleaning disk is proceeding is provided on each display unit (step 116), and the counter N(2) is incremented by one (step 117). Simultaneously the level of reflected light is read continuously, and if it is judged at step 119 that the level of reflected light has returned to a fixed level which is not lowered by 10% or more with respect to the initial value, an indication of "END OF CLEANING" and "CHANGE DISK" representing that a cleaning operation has been completed and the disk should be exchanged is provided on the display unit (step 120), and the sequence returns to the branch A. Thus, in accordance with step 102, a disk will be inserted and then processing is continued.

Figure 7B:
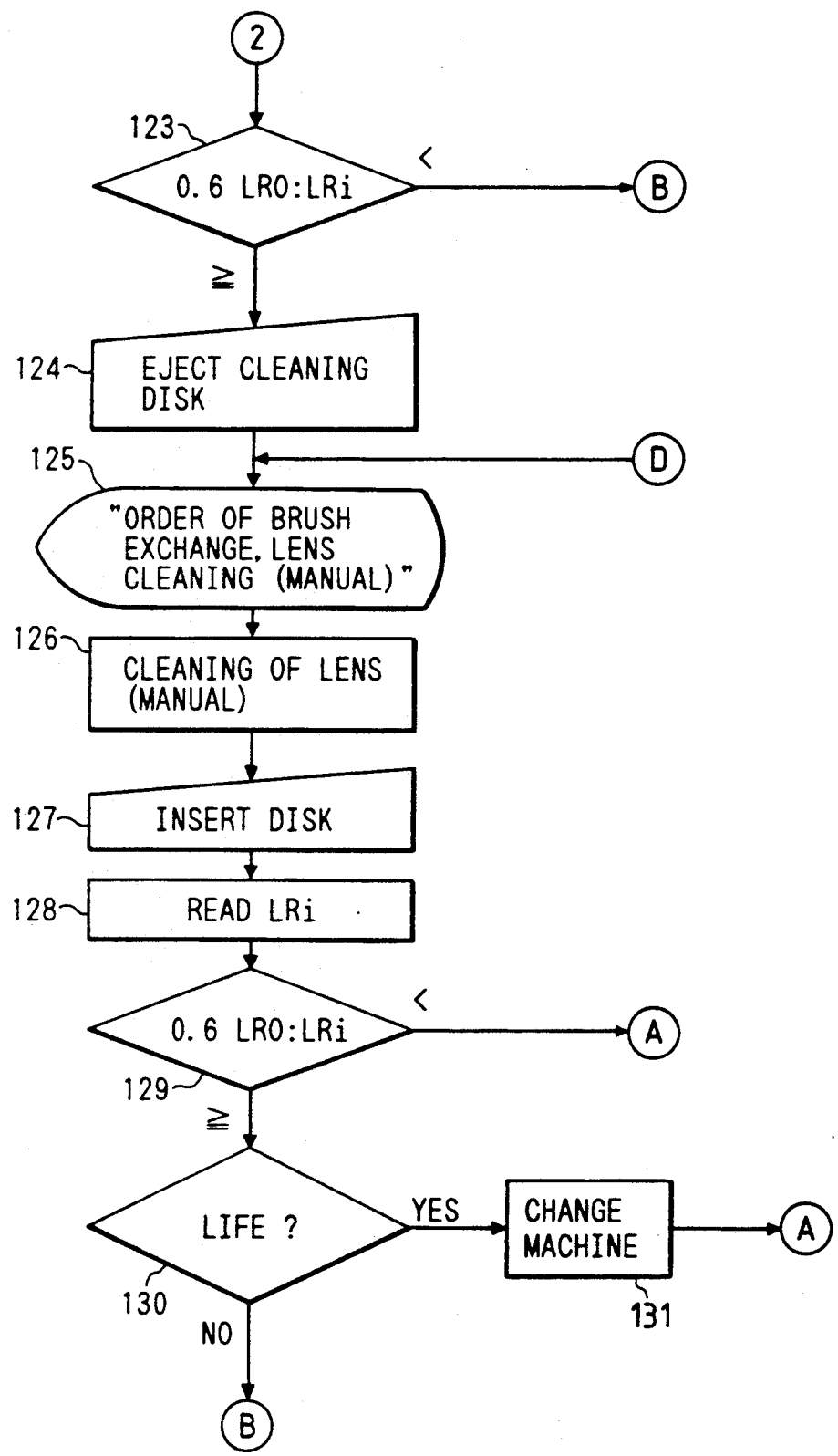

Referring now to FIG. 7B, after use for a further long period of time in which a cycle of operations at the first and second stages is repeated, the level of the reflected light 12 will be decreased further. Then, if it is judged that the third stage is entered (step 123), the host computer 3 causes the cleaning disk to be discharged (step 124). Then, a dust removing procedure for the objective lens 11 by manual operation and an exchanging method of the brush 15 are indicated on the display unit 4 or 29 (step 125). Seeing the indication, the user or service man will remove the cover for the device 1, open the cover 21 of the driving device 2 and perform removal of dust from the objective lens 11 and exchanging, in case of need, of the brush 15 (step 126). After that, a disk is inserted (step 128), and the level of the reflected light 12 is checked (step 129). If the level of the reflected light 12 has returned to a level higher than 90% of the initial value, the sequence returns to the branch A, and in accordance with step 102, a disk will be inserted and then processing is continued. If the initial state is not restored, it is judged whether or not the life of the device is over (step 130), and if the life is not over, the sequence returns to a branch C in order to perform cleaning by means of a cleaning disk again (steps 114 and 115). On the contrary, in case the life is over, an indication of "EXCHANGE OF DEVICES 1 AND 2" representing that the devices 1 and 2 should be exchanged is provided on the display unit 4 or 29 and also an indication representing that a service man should be called is provided, and a service man will perform exchanging of the devices 1 and 2 (step 131).

Since contents to be indicated on the display unit 4 or 29 by the host computer 3 are designed such that they may be effected using an interactive language, even a user can perform a dust removing operation readily.

Operation of the devices 1 and 2 and the host computer when dust removing and performance information is detected will be described below with reference to the detailed flow charts of FIGS. 8A to 8I.

First, the devices 1 and 2 will be connected as shown in FIGS. 1 and 3, and contents are stored in advance in an internal storage device of the personal computer or the floppy disk 7 or the like so that, if the power source is turned on (step 201) and then a button of the keyboard 5 or 27 is depressed to enter a command to start use of the apparatus (step 202), an indication of "INSERT TEST DISK" representing that a disk in which test data are stored should be inserted may be provided on the display unit 4. If a disk 11 in which test data are stored is inserted (step 204), then the counters Ni (i=1 to 7) in the apparatus are cleared to zero (step 205). Then, an initial ambient temperature TE0, an initial access time TA0, an initial seek time TS0, an initial number NR0 of rotations of the turntable, an initial laser power output LP0, an initial laser power reflection level LR0, an access time detection interval ITA, a time LP/off till stopping of the laser power and an instruction waiting time M/off till stopping of rotation of the turntable are read in using the test disk or a user disk, or else preset values in the apparatus are read in (step 206). Then, it is first judged whether the initial access time TA0 remains within a specified range (step 207).

After operation of the apparatus for a fixed period of time (step 212), a temperature TE0 in the device is read, and it is judged whether the temperature TE0 remains within a specified range (step 213). If the temperature TE0 remains within the specified range, the operating condition is continued. In case there is no instruction of writing or reading for a fixed period of time, the laser power and rotation of the turntable are stopped (step 214), and during such stopping, an indication representing this is provided in an interactive language similarly on the display unit 4 or 29 (step 215).

Figure 8A:
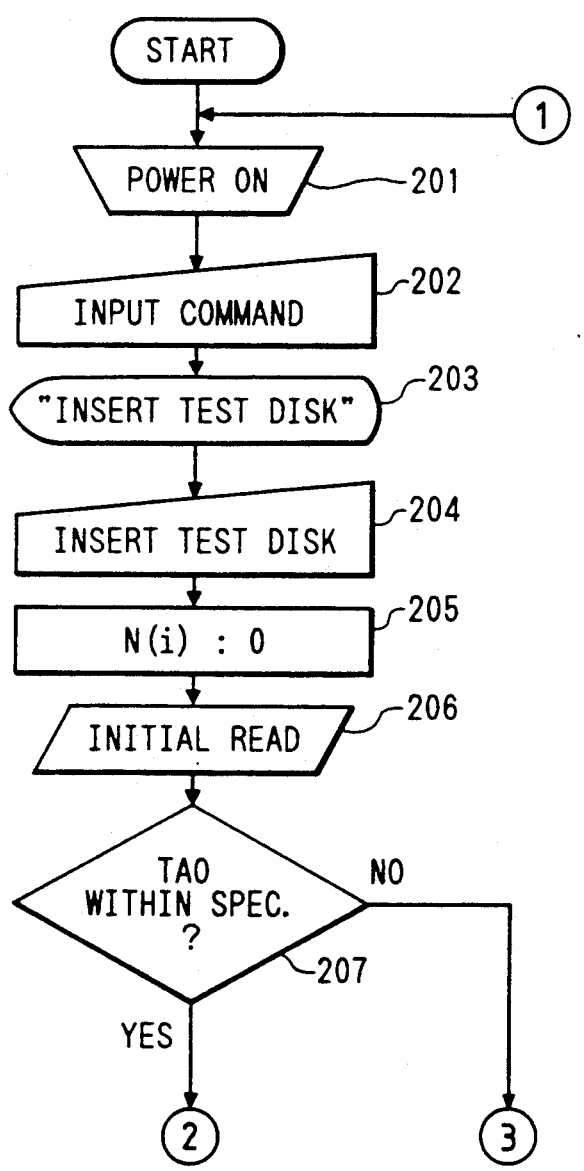
Figure 8C:
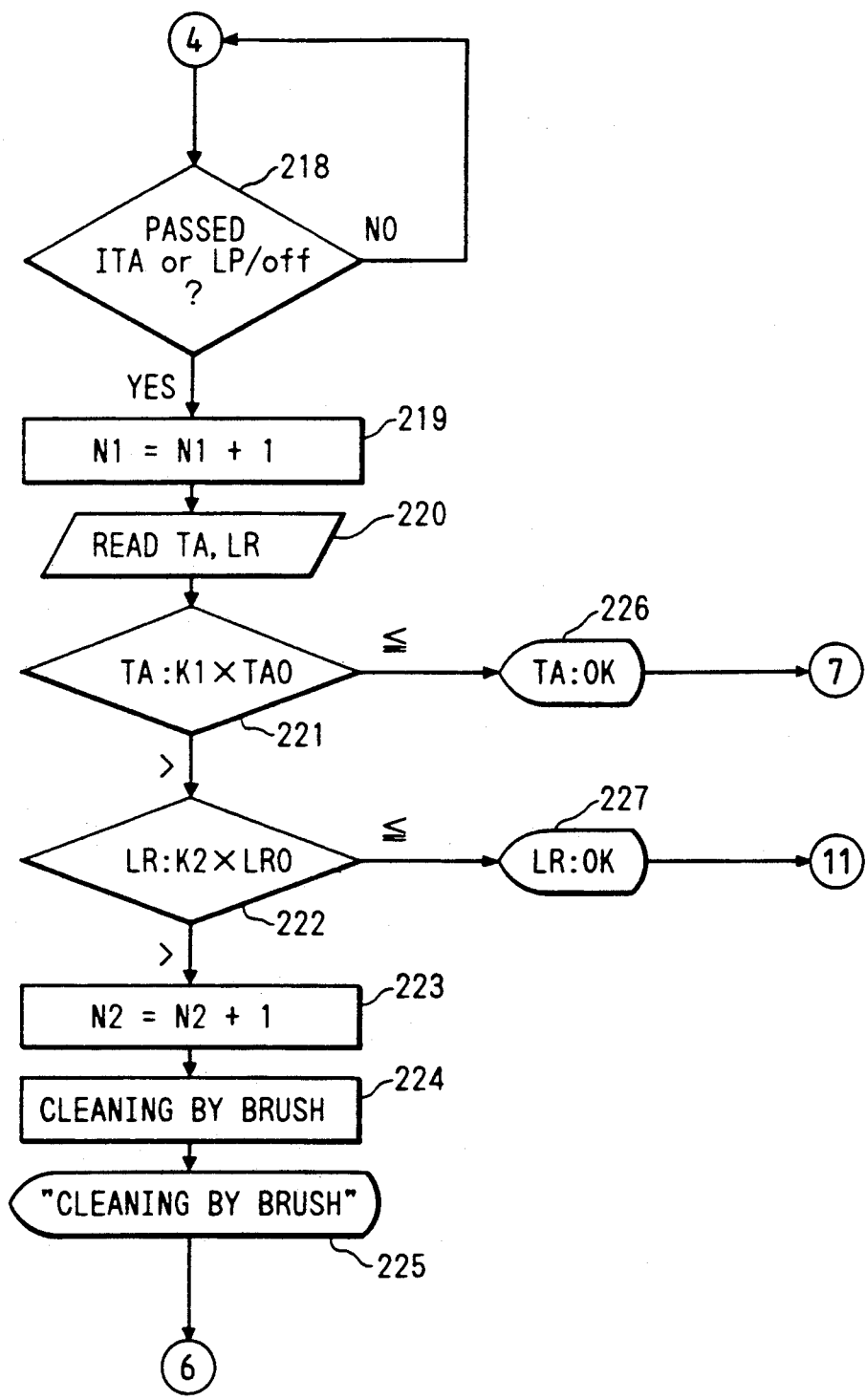

Subsequently, the sequence advances to a branch 3 in FIG. 8C. It is judged whether or not the access time detection interval ITA or the instruction waiting time LP/off has elapsed (step 218). If the time has elapsed, then the counter N1 is incremented by one (step 219), and an access time TA and a reflection level LR are read (step 220). If the access time TA does not exceed the initial access time TA0 multiplied by the coefficient K1, that is, $K1 \times TA0$ (step 221), an indication representing that the access time remains in an ordinary condition is provided on the display unit 4 or 29 (step 226), and the flow of the program is branched to a branch 7 in FIG. 8B. In case the value exceeds $K1 \times TA0$ and the reflection level of the laser power also exceeds $K2 \times LR0$ (step 222), the counter N2 is incremented by one (step 223), the turntable is stopped and automatic removal of dust from the objective lens is performed (step 224), whereafter an indication representing this is provided on the display unit (step 225). It is to be noted that, in case the access time TA exceeds $K1 \times TA0$ but the reflection level LR does not exceed $K2 \times LR0$, it is indicated on the display unit 4 or 29 that there is no abnormality in reading level nor in writing level (step 227), and the flow of the program is branched to a branch 11 of FIG. 8I.

Figure 8D:
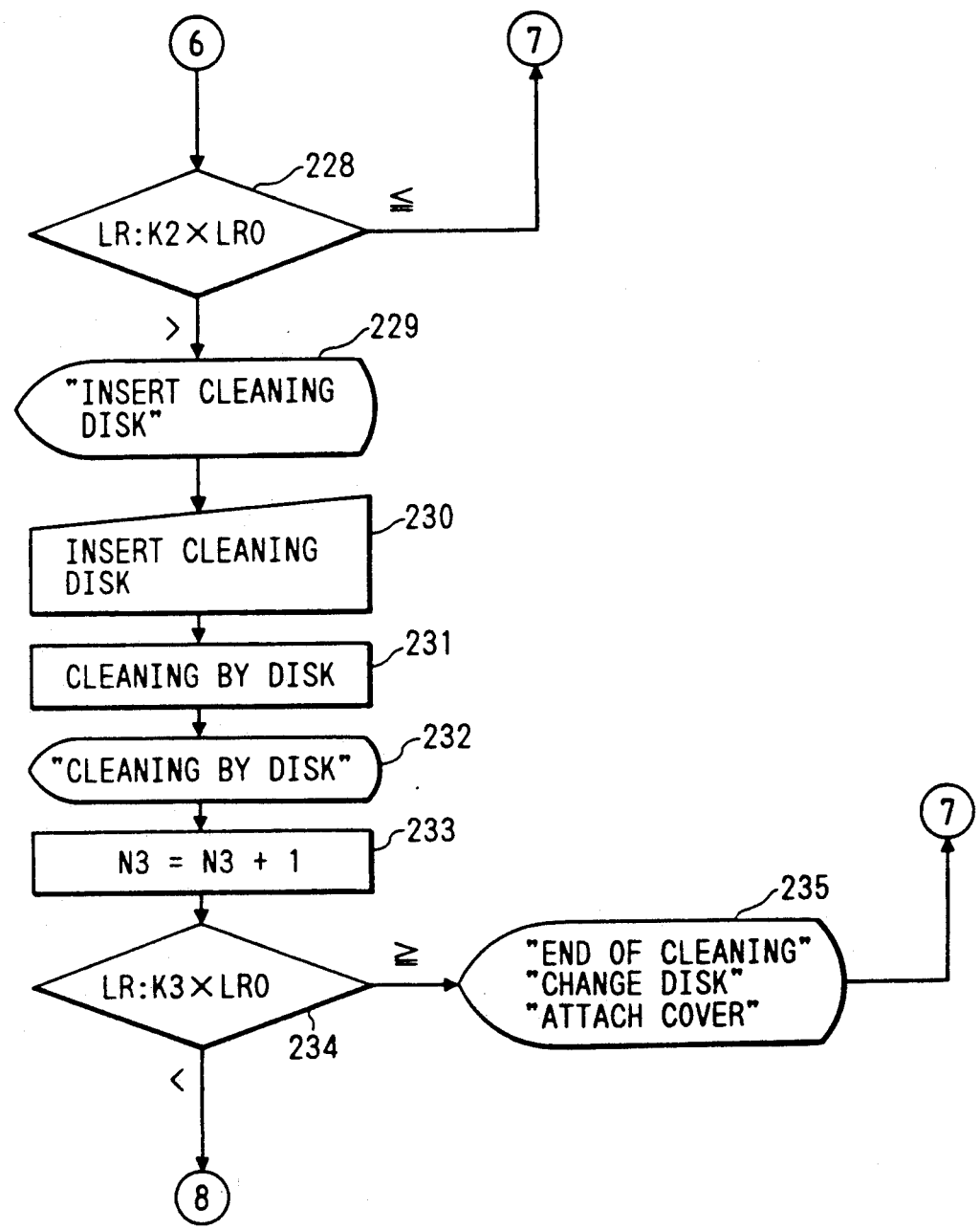

Subsequently, the sequence advances from a branch 6 of FIG. 8C to FIG. 8D. After the automatic removal of dust, a reflection level LR is read and compared with $K2 \times LR0$, and if the reflection level LR is higher (step 228), the flow of the program is branched to a branch 7 of FIG. 8B in order to render the system operative again. If the accumulation of dust proceeds until the dust cannot be removed by the brush, a message is transmitted to the display unit 4 or 29 to provide an indication representing that the ordinary disk should be taken out and a cleaning disk which contains alcohol or water should be inserted instead (step 229). Then, a cleaning disk will be inserted (step 230), and cleaning of the objective lens by the disk 10 is performed (step 231), and simultaneously an indication of "CLEANING BY DISK" representing that cleaning is proceeding is provided on the display unit 4 or 29 (step 232), whereafter the counter N3 is incremented by one (step 233). If the dust has been removed by such cleaning and the reflection level LR comes to a value higher than a certain fixed value ($K3 \times LR0$) (step 234), indications of "END OF CLEANING", "CHANGE DISK" and "ATTACH COVER" representing that cleaning is completed, that the disk 10 should be exchanged and that the dustproof cover should be mounted, respectively, are provided on the display unit 4 or 29 (step 235), and then the flow of the program is branched to the branch 7 of FIG. 8B in order to subsequently render the system operative again.

Figure 8E:
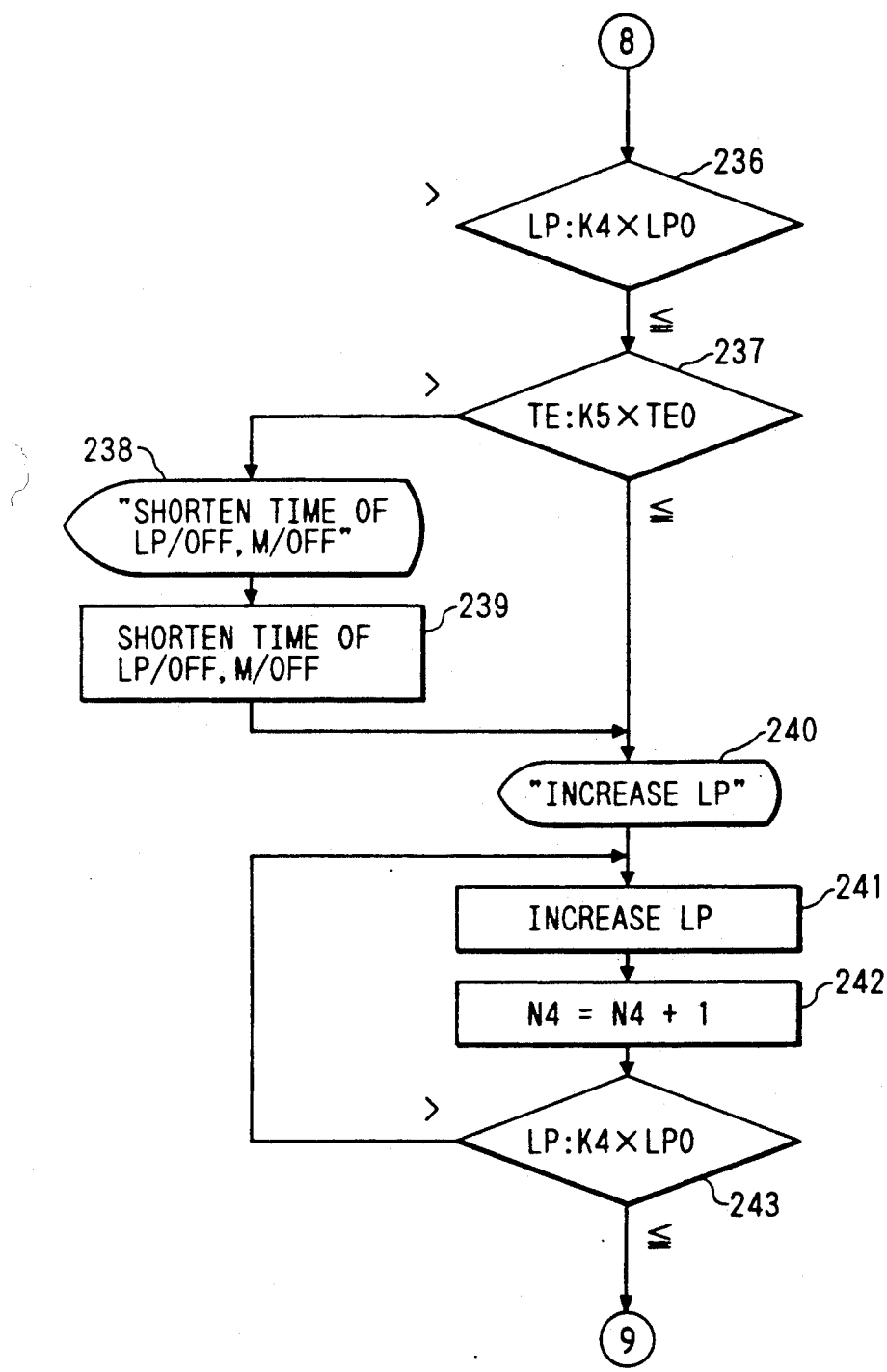

Subsequently, if, at step 234, the dust is not removed by cleaning and the reflection level LR is not returned to a value higher than the fixed level ($K3 \times LR0$), the sequence advances from a branch 8 to FIG. 8E.

A laser output LP and a temperature TE of the laser portion are detected, and if the laser output LP is lower than a predetermined value ($K4 \times LP0$) and the temperature TE of the laser portion is higher than another predetermined value ($K5 \times TE0$) (steps 236 and 237), then indications of an instruction to decrease the instruction waiting times LP/off and M/off till stopping of the turntable and the laser output as well as of a method of such decrease and a procedure of the method are provided (step 238), and then processing is executed in accordance with the procedure (step 239). In case the temperature TE of the laser portion is lower than the predetermined value ($K5 \times TE0$) (step 237), a method of amplifying the laser power and a procedure of the method are indicated on the display unit 4 or 29 (step 240), and the power will be amplified or adjusted (step 241), whereafter the counter N4 is incremented by one (step 242). It is to be noted that the adjustment is executed so that the value of the power may be restricted to the predetermined value ($K4 \times LP0$) (step 243).

It is to be noted that such adjustment is normally performed by a service man.

Figure 8F:
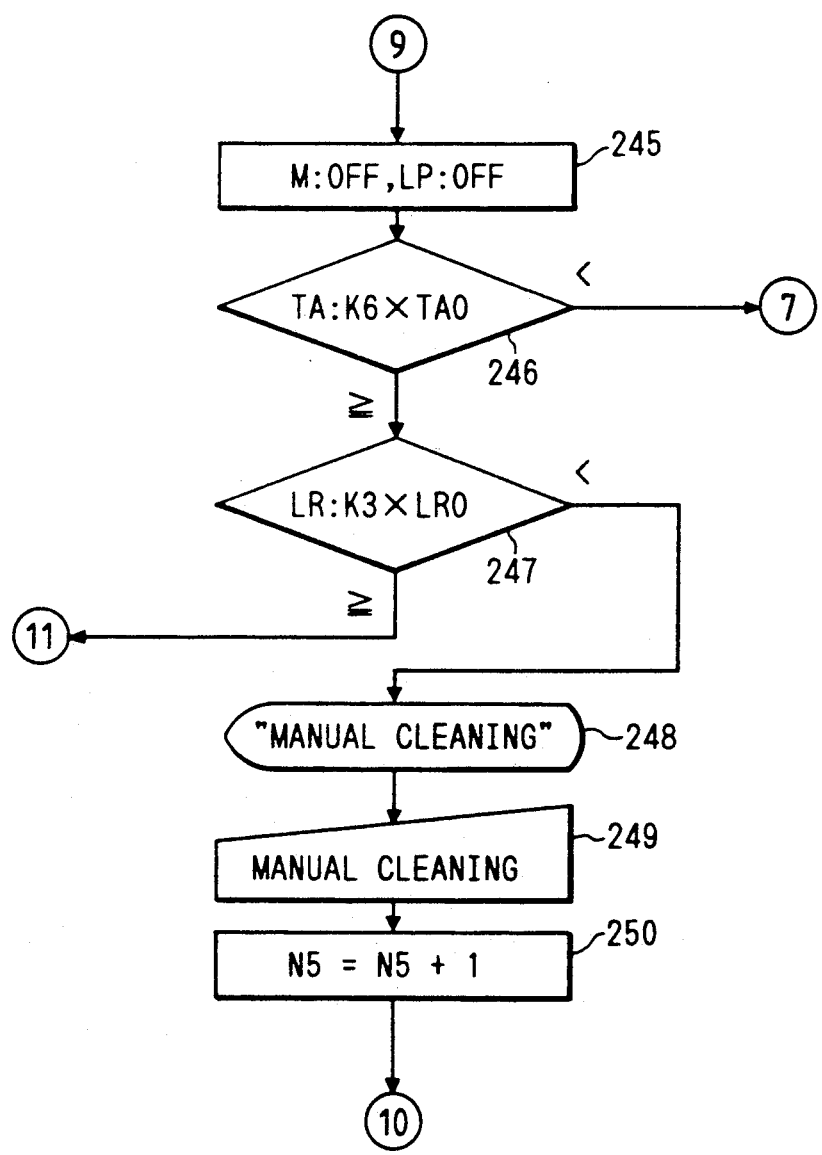

Subsequently, the sequence advances from a branch 9 of FIG. 8E to FIG. 8F. The system continues its operation, and if there is no command, the turntable and the laser output are stopped (step 245). If an access time detecting timing and a reflection level detecting timing are reached, then such access time and reflection level are detected, and if the access time does not exceed a certain value $K6 \times TA0$, then the program is branched to a branch 7 (step 246) in order to continue the operation beginning with the step 214 of FIG. 8B. If the access time TA exceeds the predetermined level but the reflection level does not exceed a certain value $K3 \times LR0$, since the access time is not elongated by the reflection level, the flow of the program is branched to a branch 11 (step 247) which continues to FIG. 8I.

In case both of the access time and reflection time exceed the predetermined values $K6 \times TA0$ and $K3 \times LR0$, respectively, an indication representing that cleaning of the lens by manual operation or exchanging of the lens cover should be performed and another indication of a procedure for the such operation are provided on the display unit 4 or 29 (step 248), and the user or service man will perform the required operation (step 249), whereafter the counter N5 is incremented by one (step 250).

Figure 8G:
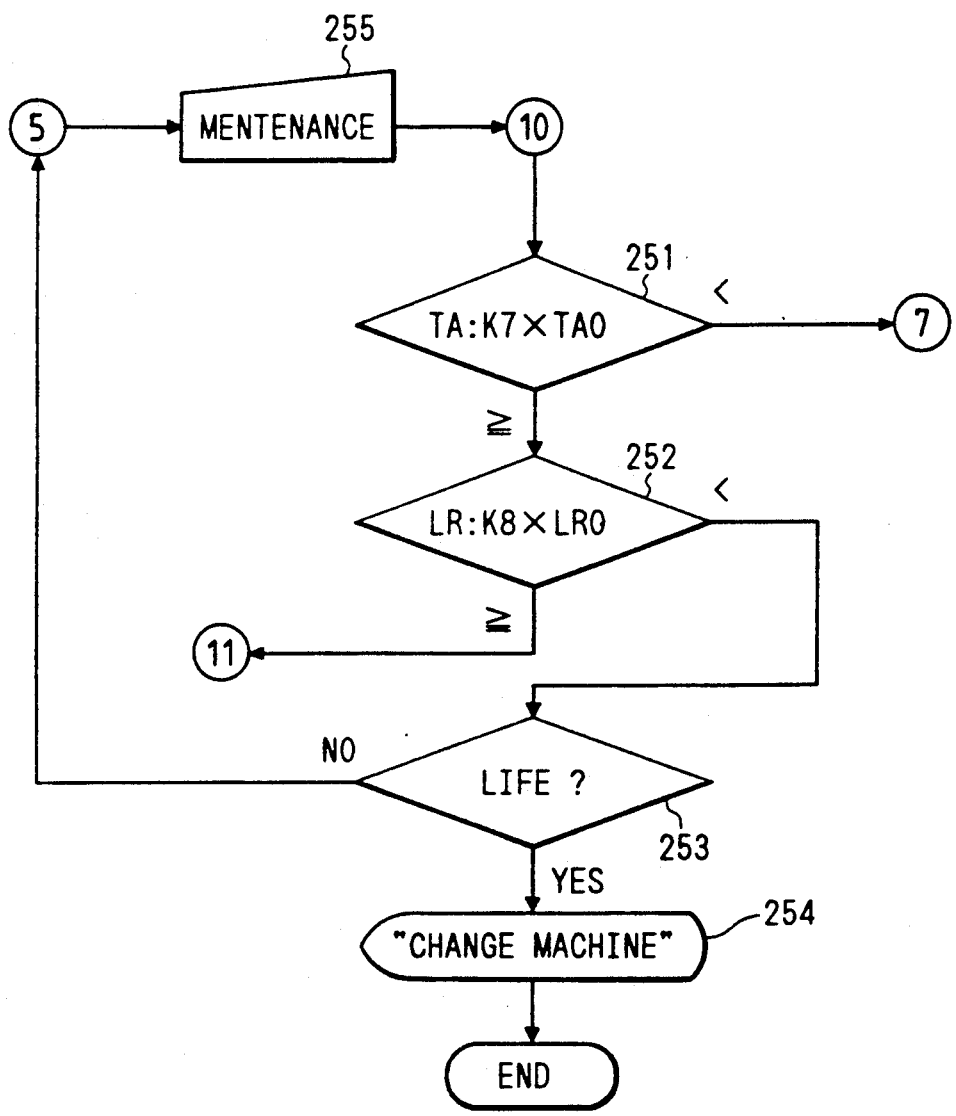

Subsequently, the sequence advances from a branch portion 10 of FIG. 8F to FIG. 8G. The system further continues its operation, and after a certain interval of time passes, an access time and a reflection level are detected, and in case the access time is longer than a certain value $K7 \times TA0$ (step 251) and the reflection level is higher than another certain value $K8 \times LR0$ (step 252), it is judged whether or not the life of the device 1 or 2 is over (step 253), and either the device 1 or 2 will be exchanged (step 254) or a maintenance will be asked to a service man (step 255). In case the access time is longer than the fixed level and the reflection level is lower than the fixed value (step 252), the flow of the program is branched to a branch 11 of FIG. 8I.

Figure 8H:
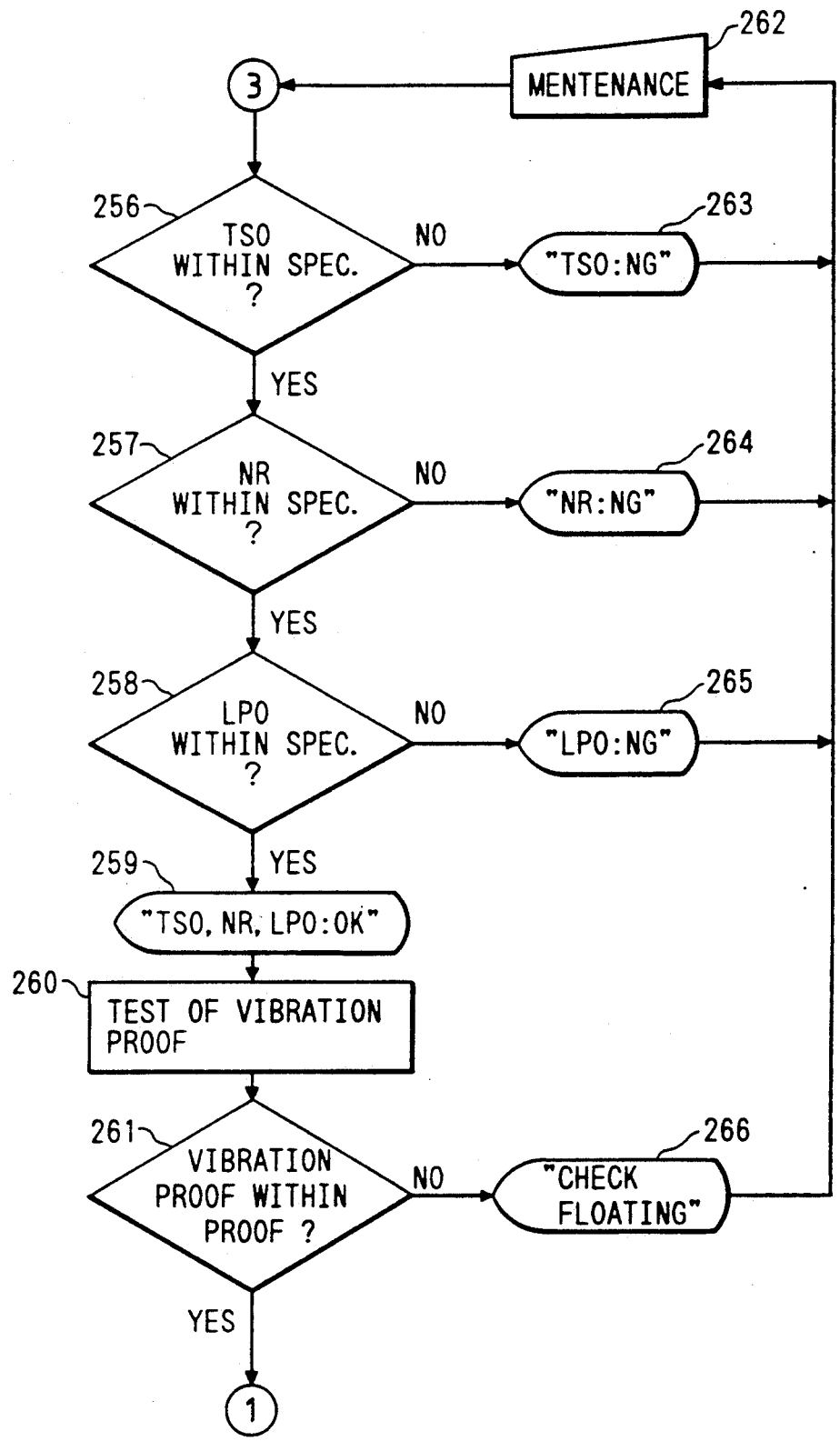

Subsequently, description will be given of FIG. 8H. The branch 3 of FIG. 8A is reached when the access time does not satisfy the specification, and using the seek time TS0 (step 256), turntable rotation number NR0 (257) and laser output LP0 (258) among the initial level check items of the system when it was incorporated into the system, initial abnormality of the devices 1 and 2 is checked depending upon whether those values remain within the individual specified ranges in order to assure a smooth maintenance. If it is judged at step 256 that the seek time TS0 does not remain within the specified range, then an indication representing that the seek time TS0 is abnormal and another indication representing that a maintenance is required are provided (step 263). In case it is judged at step 257 that the turntable rotation number NR0 does not remain within the specified range, an indication representing that the turntable rotation number NR0 is abnormal and another indication representing that a maintenance is required are provided (step 264). In case it is judged at step 258 that the laser output LP0 does not remain within the specified range, an indication representing that the laser output LP0 is abnormal and another indication representing that a maintenance is required are provided (step 265), and a maintenance will be performed by a service man (step 262). In case no abnormality is judged at any of steps 256, 257 and 258, an indication representing that the seek time TS0, turntable rotation number NR0 and laser output LP0 are all allowable (OK) is provided (step 259). Then, a vibration proof is checked in accordance with test data (step 260). The test data are different in height of convexes and concaves of pits formed on a disk so that a condition similar to a condition in which vibrations are applied to the apparatus is reproduced artificially to effect a measurement of a vibration proof level. Here, in case the vibration proof level does not remain within a specified range (step 261), an indication of a method of checking whether or not floating is being performed regularly is provided (step 266), and a maintenance will be performed by a service man (step 262). After such initial maintenances as described above are performed, the sequence of the program returns to the branch 1 of FIG. 8A.

Figure 8I:
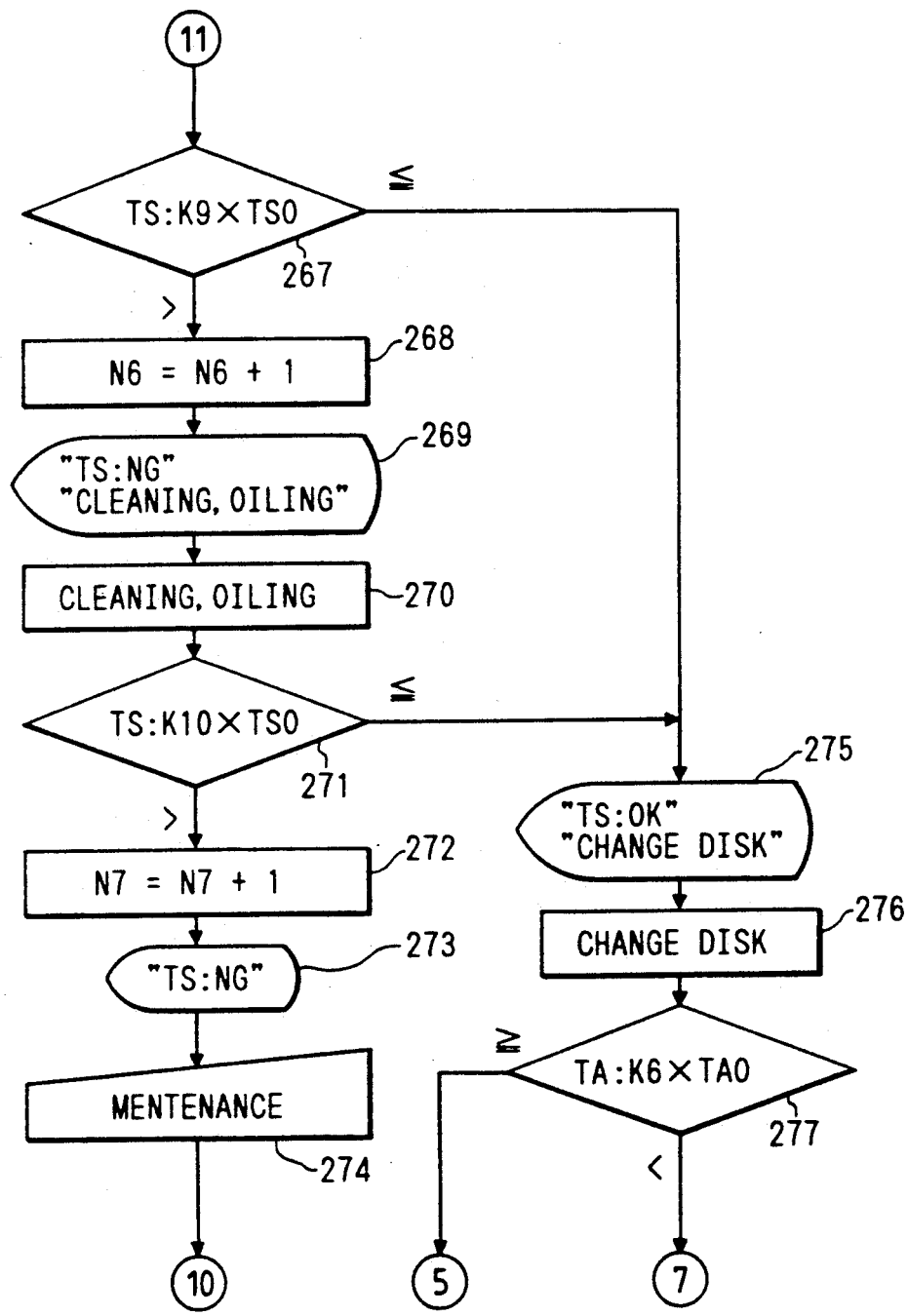

Subsequently, description will be given of FIG. 8I. When the access time is excessively long and the reflection level is higher than a fixed value, it can be considered that there is a cause of a delay of the seek time TS or a damage to a disk, and accordingly, detection of a seek time TS is performed. In case the seek time TS is longer than a certain fixed level $K9 \times TS0$ (step 267), the counter N6 is incremented by one (step 268), and a method and a procedure are indicated on the display unit 4 or 29 (step 269) so that cleaning and lubrication of a bearing, a shaft and so forth may be performed. Consequently, cleaning and lubrication will be performed (step 270). In case the seek time TS after then is greater than another certain fixed value $K10 \times TS0$ (step 270), the counter N7 is incremented by one (step 272), and an indication representing that the seek time is excessively long and another indication representing that a maintenance by a service man is required are provided on the display unit (step 273), and consequently, a maintenance by a service man will be performed (step 274). On the other hand, in case the seek time TS does not exceed $K10 \times TS0$ but the access time is excessively long (step 271), it can be considered that this is caused by a damage to the disk 10 or the like, and accordingly, an indication representing that there is no abnormality in seek time and another indication that the disk should be exchanged are provided (step 275), and the disk 10 will be exchanged (step 276). After such exchange, the access time TA is checked, and if the access time TA remains within $K6 \times TA0$, it is determined that there is no abnormality, and the sequence returns to the normal processing by way of the branch 7. On the contrary when there is some abnormality, the sequence branches from the branch 5 to FIG. 8G, and a maintenance will be performed by a service man.

According to the apparatus of the present invention, maintenance information of the devices 1 and 2 at the first stage at which performance information is detected in accordance with FIGS. 8A to 8I and a performance is restored automatically, at the second stage at which a maintenance is performed by manual operation and at the third stage at which an exchange of a device by a service man is required is recorded, not only by way the system construction of FIG. 1 but also by way of such a system construction as shown in FIG. 6 wherein maintenance information of the devices 1 and 2 is transmitted from the central computer 30 by way of the MODEM (Modulator Demodulator) 32 and the CCU (Communication Control Unit) 31, into a file 26 of the central computer 24 from the individual terminal 25 making use of the communication line 33 and is indicated by the printer 28 and on the display unit 29 by way of the keyboard 27 connected to the central computer 30, and in case a maintenance by a person is required, a travel service by a service man will be performed, but in case an automatic maintenance is applicable, a signal for the automatic maintenance is transmitted to the optical disk devices 1 and 2 by way of the communication line 33 so as to perform a maintenance.

Further, while the central computer 24, communication line 33 and terminal 25 exhibit a utilization form of a data communication system of the centralized processing type, a utilization form of the distributed processing type or any other type is applicable and various connecting forms can be provided naturally without departing from the scope of the present invention.

As described so far, according to the present invention, since contents to be displayed on the display unit 4 by the host computer 3 or the driving devices 1 and 2 are indicated using an interactive language, there is an effect that a maintenance can be performed readily even by a user.

Meanwhile, since rotation of the disk motor is stopped and also the laser power can be turned off after a condition wherein no instruction is transmitted from the host computer has continued for a fixed interval of time, dust which may be admitted into the apparatus together with air which is admitted by rotation of a disk can be prevented and the life of the laser power can be improved. Further, since a performance limit value can be detected and an indication of information of exchange of a device before a system down takes place can be provided to a user, there is an effect that the maintenance performance of the system is improved.

Further, since a performance detection value of an optical disk can be detected by a central computer making use of a communication line as seen in FIG. 6, maintenance information of the system can be obtained directly without a user or a service man, and consequently, there is an effect that the reliability of maintenance data is improved and labor for maintenance is saved significantly.

Meanwhile, each time a maintenance is performed, the effective number of such maintenances and the detection interval are stored into the counters of the devices 1 and 2 or into part of the host computer 3 or onto a floppy disk so that they may be useful to a succeeding maintenance of the apparatus, and the maintenance performance can be improved.

While various detection amounts and dust removing methods are involved in the foregoing description, any aggregate of individual combinations may be available. It is to be noted that, while, for example, an access time TA and a reflection level LR are used as detection amounts, only either one of them may make sense. Further, any replacement in order may be applicable, and while, in the embodiment, maintenance information is provided on a display unit using an interactive language, a method of giving a warning by means of sounds may be additionally provided.

According to the present invention, the method of removing dust on an objective lens is such that methods of cleaning the objective lens and exchanging a brush are indicated in detail on a display unit in stages in response to an amount of dust in accordance with the program having an interactive language so that even a user can remove dust on the objective lens readily in a short period of time. Consequently, the total MTTR (Mean Time To Repair) is reduced while the MTBF (Mean Time Between Failures) is increased beyond a certain value to improve the availability of the system.

Meanwhile, before a failure takes place at part or the entirety of the system, an indication warning in accordance with an interactive language is performed and besides a method of a maintenance is also notified to a user and a service man. Accordingly, there are effects that the MTTF (Mean Time To Failure) of the apparatus system is reduced, that the MTBF (Mean Time Between Failures) can be increased and that the maintenance performance of the system can be improved significantly.

Meanwhile, in a system wherein a plurality of apparatus are connected by way of a communication line, a progress of performance values and a progress of maintenance of the system can be monitored on the real time basis on a display device of a central computer by an observer, and accordingly, the MTTF (Mean Time To Failure) can be decreased and the maintenance performance can be improved.

Further, since performance values and maintenance information of the apparatus or system can be recorded, a progress of a maintenance on the market is always recorded, and when the apparatus is returned to a service center or a factory for the repair, a cause of a failure can be pursued readily. Accordingly, there are effects that the MTTF (Mean Time To Failure) can be reduced and that it can be utilized as a system resource of maintenance.

Further, since the laser power can be turned off if no instruction is received from the host computer for a fixed period of time, the life of the laser can be elongated. Also, since rotation of the disk motor can be stopped if no instruction is received for a fixed period of time, a time for which external air is sucked by rotation of the disk motor can be decreased and consequently dust which may be admitted into the apparatus together with external air can be reduced. Accordingly, possible deterioration of the laser reflection level by dust accumulated on an objective lens of an optical pickup can be prevented.

In addition, since a time until the laser power is turned off and another time until a stopping operation of rotation of a disk motor is started automatically or by manual operation in response to values of detection amounts, the apparatus can be used in conformity with environments of use.

We claim:

1. A dust removing system for an optical disk device, comprising:
   an optical disk device for irradiating light to an optical disk to read out information recorded on the optical disk;
   first controlling means connected to said optical disk device for controlling the read out of information from said optical disk device; and
   second controlling means for detecting an influence of dust upon said optical disk device and for displaying different messages regarding the removal of the dust on a display unit in response to different levels of the influence of said dust, including means for detecting at least a first stage, where a level of influence of said dust is in a predetermined low range, and a second stage where a level of influence of said dust is in a second range greater than said predetermined low range, and further including means, when said first stage is detected, for automatically discharging the optical disk device, automatically cleaning an objective lens of said optical disk device, and displaying a message on said display unit that said cleaning is in process, and means, when said second stage is detected, for automatically discharging the optical disk device and displaying a message on said display unit indicating that cleaning of said objective lens should be performed using a cleaning disk.

2. A dust removing system according to claim 1, wherein said means for automatically cleaning said objective lens comprises a brush provided in said optical disk device.

3. A dust removing system according to claim 1, wherein said second controlling means includes means for forcusing a laser beam in said optical disk device on the optical disk by means of said objective lens, and means for detecting an amount of light reflected from the optical disk and detecting an influence of dust upon said disk device.

4. A dust removing system according to claim 1, wherein said second controlling means includes means for detecting three stage of judgement levels in accordance with an amount of the reflected light, including a third stage at which the level of an influence of dust is higher than that at the second stage, and means, when said third stage is detected, for displaying a message on said display unit representing that cleaning of said objective lens should be performed by manual operation.

5. A dust removing system according to claim 4, wherein, after completion of cleaning, an amount of light reflected from the optical disk is detected to check an influence of dust upon said optical disk device again, and when the influence of dust is reduced to a value lower than a predetermined level, normal processing is restored.

6. A dust removing system according to claim 1, wherein said second controlling means detects an access time of said optical disk device to detect an influence of dust upon said optical disk device.

7. A dust removing system according to claim 6, wherein said second controlling means includes means for detecting three stage of judgement levels in accordance with the access time, including a third stage at which the level of an influence of dust is higher than that at the second stage, and means, when said third stage is detected, for displaying a message on said display unit representing that cleaning of said objective lens should be performed by manual operation.

8. A dust removing system according to claim 7, wherein, after completion of cleaning, an amount of light reflected from the optical disk detected to check an influence of dust upon said optical disk device again, and when the influence of dust is reduced to a value lower than a predetermined level, normal processing is restored.

9. A dust removing system according to claim 6, wherein said second controlling means includes means, when said second stage is detected, for displaying a message on said display unit representing that the power of a laser in said optical disk device for irradiating said light should be increased.

10. A dust removing system according to claim 1, wherein said second controlling means further detects a seek time said disk device, and when the seek time is longer than a predetermined interval of the time, a message is indicated on said display unit representing that cleaning and lubrication of a bearing portion should be performed.

11. A dust removing system according to claim 1, wherein said second controlling means further detects an ambient temperature after lapse of time of a predetermined interval of time after operation of said disk device, and when the ambient temperature is higher than a predetermined value, a message is indicated on said display unit representing that an air blower should be rendered operative.

12. A dust removing system according to claim 1, wherein said second controlling means further checks an initial value using a test disk, and when the initial value does not remain within a predetermined range, a message is indicated on said display unit representing that a maintenance is required.

13. A dust removing system according to claim 1, wherein said second controlling means includes means for detecting three stage of judgement levels, including a third stage at which the influence of dust is highest, and means, if said second controlling means judges that the influence of dust is at the third stage, for displaying a message on said display unit representing that exchanging of said optical disk device should be performed.

14. A dust removing system according to claim 1, wherein said first controlling means further stops, when a reading or writing instruction is not received for a predetermined period of time, emission of light to be irradiated upon the optical disk, and wherein a message is indicated on said display unit representing that emission of light is stopped.

15. A dust removing system according to claim 1, wherein said first controlling means further stops, when a reading or writing instruction is not received for a predetermined period of time, rotation of a motor for rotating the optical disk, and wherein a message is indicated on said display unit representing that rotation is stopped.

16. A dust removing system according to claim 14 or 15, wherein said second controlling means controls in response to a degree of the influence of dust such that a stopping time may be decreased when the influence increases.

17. A dust removing system for an optical disk device, comprising:
   an optical disk device for irradiating light to an optical disk to read out information recorded on the optical disk;

first controlling means connected to said optical disk device for controlling the read out of information from said optical disk device; and second controlling means for detecting an influence of dust upon said optical disk device and for displaying different messages regarding the removal of the dust on a display unit in response to different levels of the influence of said dust, including means for detecting at least a first stage, where a level of influence of said dust is in a predetermined low range, a second stage where a level of influence of said dust is in a second range greater than said predetermined low range, and a third stage, where a level of influence of said dust is in a predetermined high range, and further including means, when said first stage is detected, for automatically discharging the optical disk device, automatically cleaning an objective lens of said optical disk device, and displaying a message on said display unit that said cleaning is in process, means, when said second stage is detected, for automatically discharging the optical disk device and displaying a message on said display unit indicating that cleaning of said objective lens should be preformed using a cleaning disk, and means, when said third stage is detected, for displaying a message on said display unit that cleaning of said objective lens should be performed by manual operation.

18. A dust removing system according to claim 17, wherein said means for automatically cleaning said objective lens comprises a brush provided in said optical disk device.

* * * * *